US008151218B2

(12) United States Patent
McKaskle et al.

(10) Patent No.: US 8,151,218 B2
(45) Date of Patent: Apr. 3, 2012

(54) EVALUATION OF GRAPHICAL PROGRAM NODES

(75) Inventors: Greg McKaskle, Austin, TX (US); Christina Rogers, Austin, TX (US)

(73) Assignee: National Instruments Corporation, Austin, TX (US)

( * ) Notice: Subject to any disclaimer, the term of this patent is extended or adjusted under 35 U.S.C. 154(b) by 429 days.

(21) Appl. No.: 12/511,168

(22) Filed: Jul. 29, 2009

(65) Prior Publication Data

US 2011/0029932 A1    Feb. 3, 2011

(51) Int. Cl.
 *G06F 3/048*    (2006.01)
(52) U.S. Cl. .......................... 715/853; 715/734; 715/736
(58) Field of Classification Search .................. 715/853, 715/734, 736, 737, 738
See application file for complete search history.

(56) References Cited

U.S. PATENT DOCUMENTS

| | | | |
|---|---|---|---|
| 4,914,568 A | 4/1990 | Kodosky et al. | |
| 5,187,788 A * | 2/1993 | Marmelstein | 717/109 |
| 5,481,741 A * | 1/1996 | McKaskle et al. | 345/522 |
| 5,850,548 A * | 12/1998 | Williams | 717/107 |
| 5,966,532 A * | 10/1999 | McDonald et al. | 717/105 |
| 5,974,254 A | 10/1999 | Hsu | |
| 6,002,869 A * | 12/1999 | Hinckley | 717/124 |
| 6,026,362 A * | 2/2000 | Kim et al. | 705/317 |
| 6,173,438 B1 | 1/2001 | Kodosky et al. | |
| 6,219,628 B1 | 4/2001 | Kodosky et al. | |
| 6,425,120 B1 * | 7/2002 | Morganelli et al. | 717/109 |
| 6,437,805 B1 * | 8/2002 | Sojoodi et al. | 715/763 |
| 6,587,995 B1 * | 7/2003 | Duboc et al. | 716/106 |
| 7,092,835 B2 * | 8/2006 | Bostanci et al. | 702/108 |
| 7,302,675 B2 * | 11/2007 | Rogers et al. | 717/125 |
| 7,370,315 B1 * | 5/2008 | Lovell et al. | 717/100 |
| 2001/0011370 A1 * | 8/2001 | Gunter et al. | 717/4 |
| 2001/0020291 A1 | 9/2001 | Kudukoli et al. | |
| 2001/0024211 A1 * | 9/2001 | Kudukoli et al. | 345/763 |
| 2001/0034879 A1 * | 10/2001 | Washington et al. | 717/1 |
| 2001/0035879 A1 * | 11/2001 | Washington et al. | 345/763 |
| 2002/0083413 A1 * | 6/2002 | Kodosky et al. | 717/109 |
| 2002/0129333 A1 * | 9/2002 | Chandhoke et al. | 717/107 |
| 2003/0061600 A1 * | 3/2003 | Bates et al. | 717/133 |
| 2003/0192032 A1 * | 10/2003 | Andrade et al. | 717/124 |

(Continued)

OTHER PUBLICATIONS

"Keyboard Shortcuts—LabVIEW 2009 Help"; National Instruments; Jun. 2009; Obtained from Internet: http://zone.ni.com/reference/en-XX/help/371361F-01/lvhowto/keyboard_shortcuts/.

(Continued)

*Primary Examiner* — Weilun Lo
*Assistant Examiner* — Rashedul Hassan
(74) *Attorney, Agent, or Firm* — Meyertons, Hood, Kivlin, Kowert & Goetzel, P.C.; Jeffrey C. Hood; Joel L. Stevens (57) ABSTRACT

Evaluation of graphical program nodes. A first graphical program may be displayed on a display. The first graphical program may include a plurality of interconnected nodes which visually specifies functionality of the first graphical program. User input may be received which selects at least one of the plurality of interconnected nodes while editing the first graphical program. A second graphical program may be automatically generated based on the user input. The second graphical program may include the at least one node. The second graphical program may be executable to allow the user to evaluate the at least one node. The second graphical program may be displayed on the display.

20 Claims, 7 Drawing Sheets

U.S. PATENT DOCUMENTS

| | | | |
|---|---|---|---|
| 2004/0034696 A1* | 2/2004 | Joffrain et al. | 709/217 |
| 2004/0034847 A1* | 2/2004 | Joffrain et al. | 717/113 |
| 2005/0035967 A1* | 2/2005 | Joffrain et al. | 345/440 |
| 2005/0090997 A1* | 4/2005 | Bostanci et al. | 702/108 |
| 2005/0091602 A1* | 4/2005 | Ramamoorthy et al. | 715/763 |
| 2005/0268288 A1* | 12/2005 | Nattinger | 717/125 |
| 2006/0190105 A1 | 8/2006 | Hsu et al. | |
| 2006/0259871 A1* | 11/2006 | Washington et al. | 715/763 |
| 2008/0034345 A1* | 2/2008 | Curtis et al. | 717/100 |
| 2008/0109785 A1* | 5/2008 | Bailey | 717/109 |
| 2008/0263515 A1* | 10/2008 | Dellas et al. | 717/109 |
| 2010/0031231 A1* | 2/2010 | Ilic et al. | 717/105 |
| 2010/0077260 A1* | 3/2010 | Pillai et al. | 714/46 |

OTHER PUBLICATIONS

"LabVIEW Fundamentals—Chapter 7—Creating VIs and SubVIs"; National Instruments; Aug. 2005; 8 pages.

* cited by examiner configured with
program instructions
according to
embodiments of the
invention computer system
82

EVALUATION OF GRAPHICAL PROGRAM NODES

FIELD OF THE INVENTION

The present invention relates to the field of graphical programming, and more particularly to a system and method for enabling a user to evaluate graphical program nodes.

DESCRIPTION OF THE RELATED ART

Graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

However, when a user is unfamiliar with various graphical program tools or nodes, it is sometimes hard to adequately provide information on use of the tools or nodes. Correspondingly, improvements in editing graphical programs would be desirable.

SUMMARY OF THE INVENTION

Various embodiments of a system and method for enabling a user to evaluate graphical program nodes.

A first graphical program may be displayed on a display of a computer system. The first graphical program may be created in response to user input, e.g., in a manual or automatic fashion. The first graphical program includes a plurality of interconnected nodes which visually specifies functionality of the first graphical program.

User input may be received which selects at least one of the plurality of interconnected nodes while editing the first graphical program. For example, the user may select a single node or a plurality of nodes, as desired.

A second graphical program may be automatically generated based on the user input and may be provided for display on the display. The second graphical program includes the selected nodes of the first graphical program and is executable to allow the user to evaluate the selected nodes. More specifically, the user is able to modify and/or execute the second graphical program to determine, for example, functionality and use of the selected nodes.

The second graphical program may include one or more additional graphical program nodes coupled to the selected nodes. The one or more additional nodes may allow the second graphical program to be executable to evaluate the selected nodes.

The second graphical program may further include a user interface portion, which may be generated during the automatic generation of the second graphical program. The user interface portion, or front panel, may include one or more controls or indicators corresponding to the selected nodes. Accordingly, during execution of the second graphical program, the user interface portion may be displayed and the user may be able to interact with execution of the second graphical program via the user interface portion.

The second graphical program may include one or more data types which correspond to data types of the first graphical program that are associated with the selected nodes. For example, the inputs or outputs of the selected nodes may have been specified as having specific data types, and those data types may be used in the second graphical program (e.g., for the respective inputs and outputs of the selected nodes).

After automatic generation of the second graphical program, the user may provide input editing the second graphical program. For example, the user may modify properties of the nodes of the second graphical program, modify or delete nodes or wires in the second graphical program, and/or add one or more additional nodes to the second graphical program. For example, the user may add the additional nodes from the first graphical program and/or from a graphical program node palette in the graphical program development environment.

After editing the second graphical program, the changes made to the second graphical program may be automatically applied to the first graphical program, e.g., in response to user input. For example, the user may provide input that specifies that the changes made to the second graphical program should be applied to the first graphical program, and the first graphical program may be correspondingly modified based on the user's input.

The method described above may be implemented as a computer program (e.g., program instructions stored on a memory medium, which are executable by a processor), as a computer system, and/or on various other apparatus, as desired.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 2001/0020291 (Ser. No. 09/745,023) titled "System and Method for Programmatically Generating a Graphical Program in Response to Program Information," filed Dec. 20, 2000.

U.S. Patent Application Publication No. 2006/0190105 titled "Merging Graphical Programs," filed Jan. 12, 2006.

U.S. Pat. No. 5,974,254 titled "Method for Detecting Differences Between Graphical Programs," filed Jun. 6, 1997.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed.

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Figure 1A:
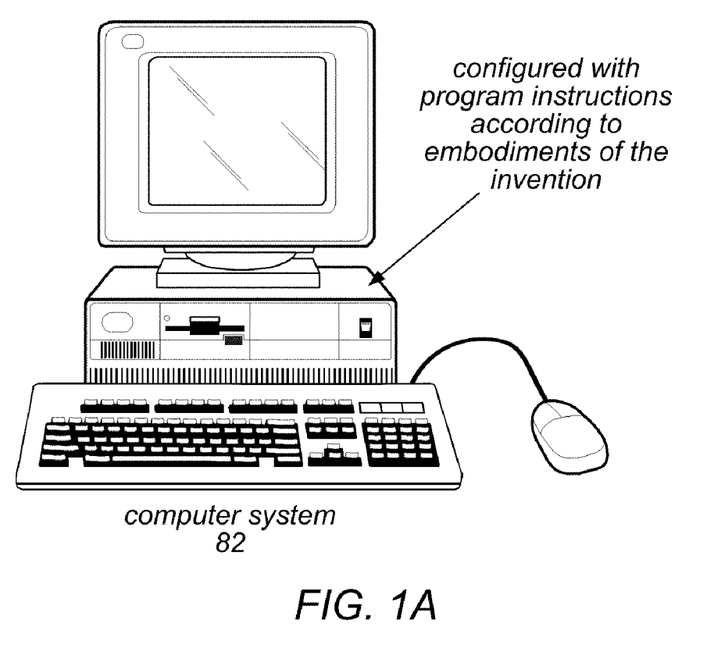
FIG. 1A illustrates a computer system operable to execute a graphical program according to an embodiment of the present invention.

FIG. 1A—Computer System

One embodiment of a method for enabling a user to evaluate graphical program nodes is described below.

As shown in FIG. 1A, the computer system 82 may include a display device operable to display the graphical program as the graphical program is created and/or executed. The display device may also be operable to display a graphical user interface or front panel of the graphical program during execution of the graphical program. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more graphical program development environments which are executable to perform the methods described herein. The memory medium may also store operating system software, as well as other software for operation of the computer system. Various embodiments further include receiving or storing instructions and/or data implemented in accordance with the foregoing description upon a memory medium.

Figure 1B:
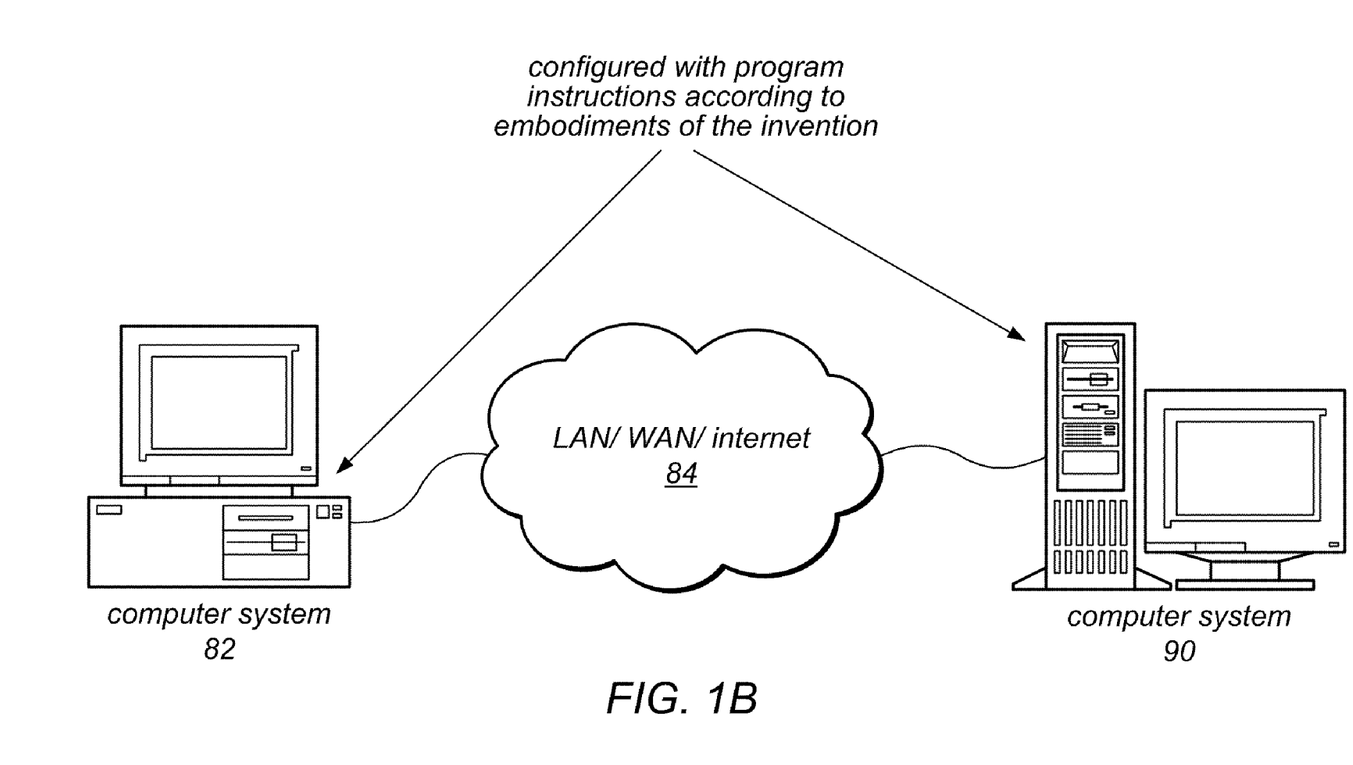
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device coupled to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
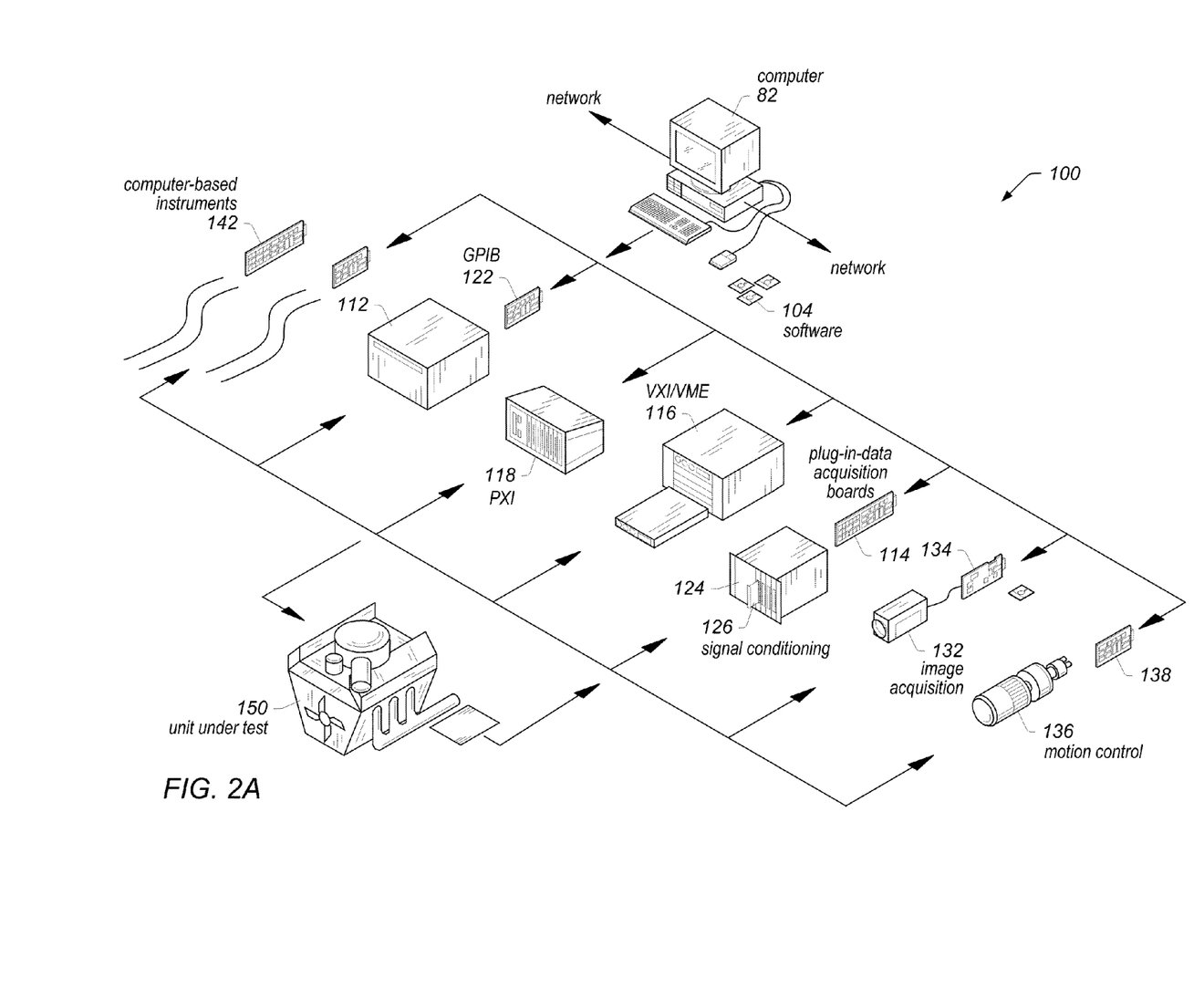
FIG. 2A illustrates an instrumentation control system according to one embodiment of the invention.

FIG. 2A illustrates an exemplary instrumentation control system 100 which may be controlled or used during execution of graphical programs. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (WUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (WUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
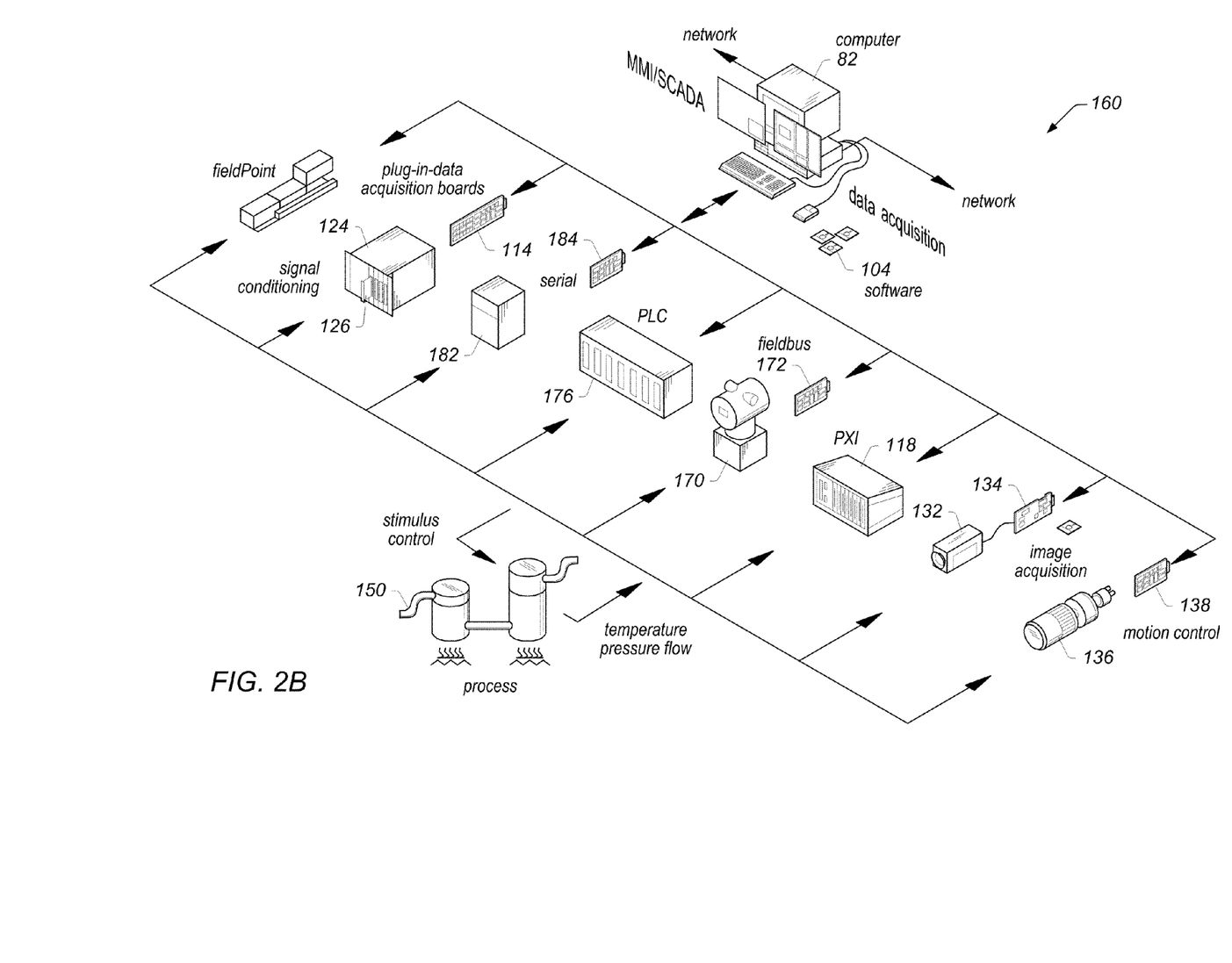
FIG. 2B illustrates an industrial automation system according to one embodiment of the invention.

FIG. 2B illustrates an exemplary industrial automation system 160 which may be controlled or used during execution of graphical programs. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

In the embodiments of FIGS. 2A and 2B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 3:
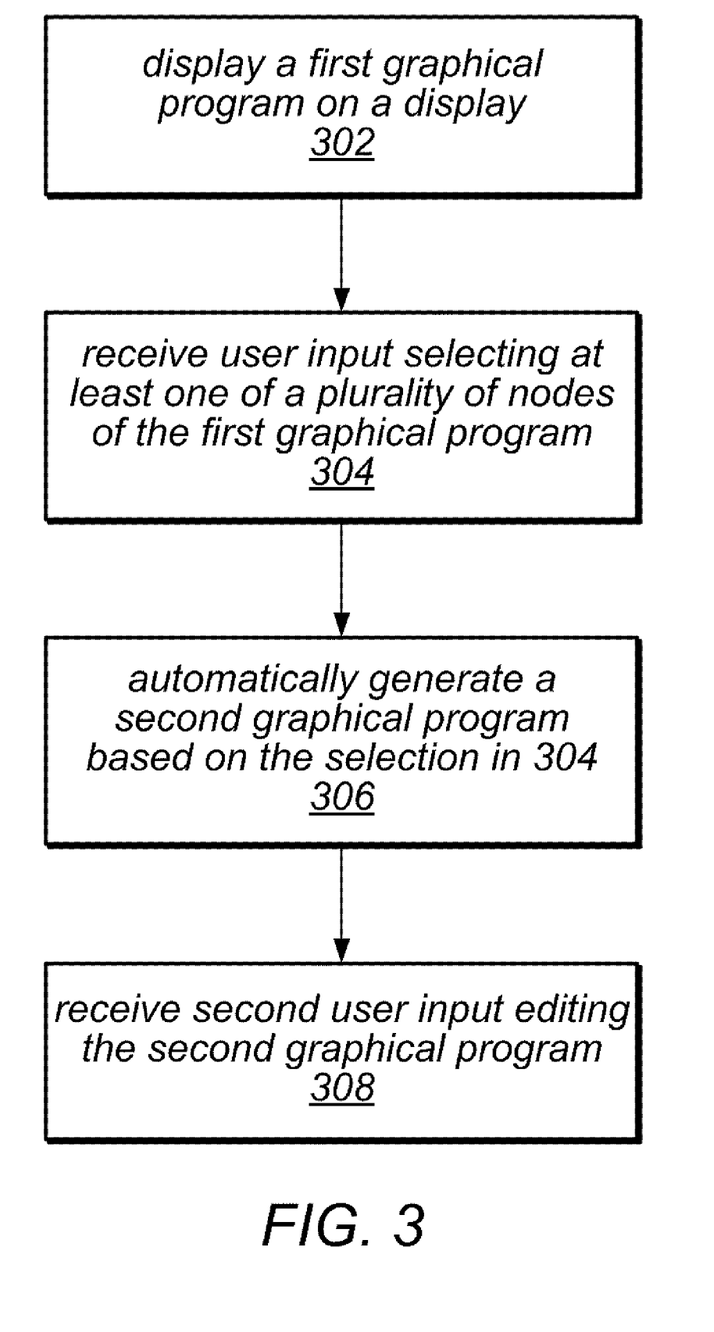
FIG. 3 is a flowchart diagram illustrating one embodiment of a method for enabling a user to evaluate graphical program nodes.

FIG. 3—Method for Evaluating Graphical Program Nodes

FIG. 3 illustrates a method for enabling a user to evaluate graphical program nodes. The method shown in FIG. 3 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 302 a first graphical program may be created (or otherwise displayed) on the computer system 82 (or on a different computer system). The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be created in 302 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument.

Figure 4:
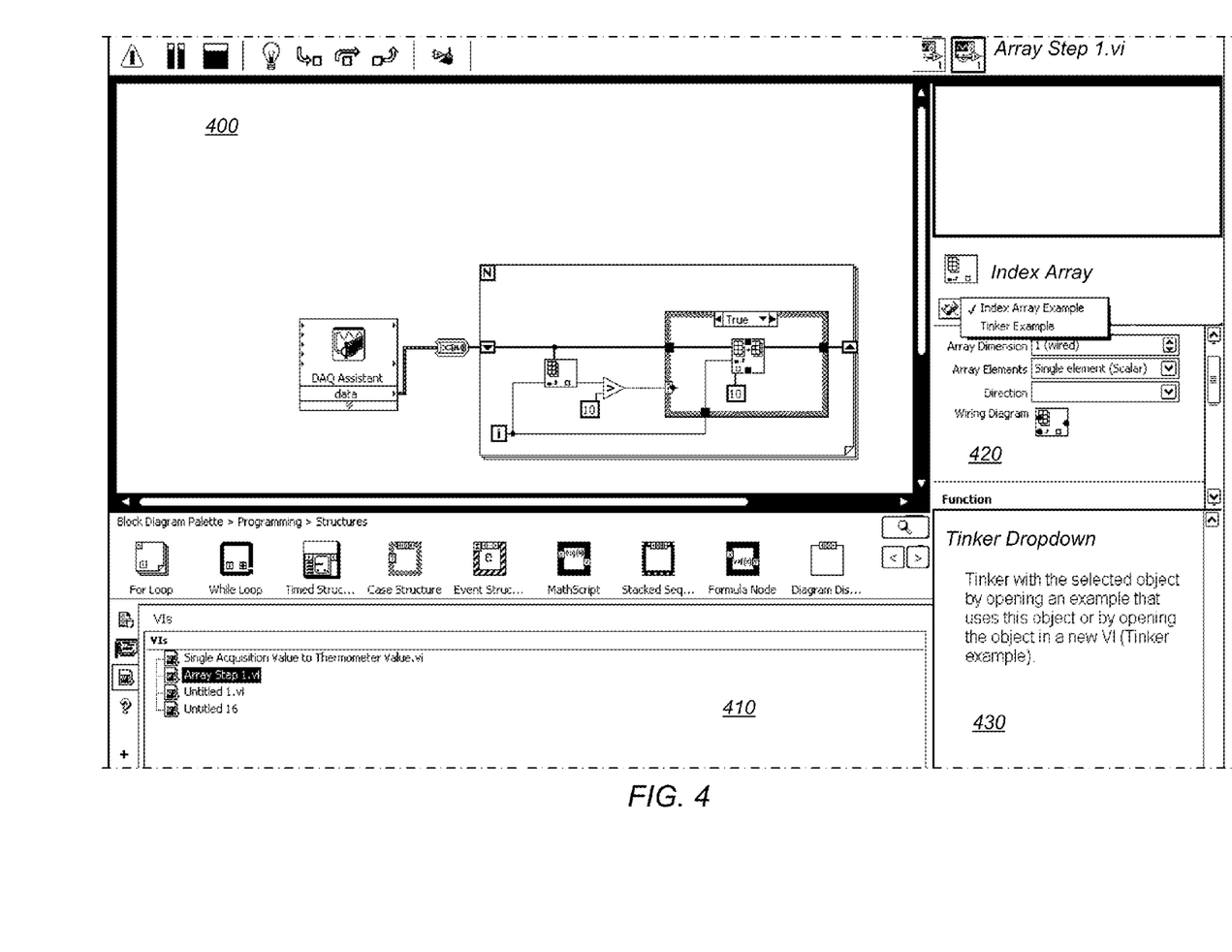
FIGS. 4, 5A, and 5B are exemplary screenshots corresponding to the method of FIG. 3, according to various embodiments.

FIG. 4 illustrates an exemplary first graphical program displayed in a single window graphical program development environment. As shown, in window pane 400, an graphical program is displayed, which includes a plurality of interconnected nodes. As also shown, a user may select to "tinker" or evaluate execution of nodes in the configuration pane 420 as described in the description pane 430. Further details regarding the evaluation of graphical program nodes are described herein. As also shown, pane 410 provides a palette of graphical program nodes as well as a library of presently edited graphical programs (shown as virtual instruments or vi's).

In 304, a user may select at least one of a plurality of nodes of the first graphical program for evaluation. For example, the user may click on or otherwise specify one or more nodes in the first graphical program and then may select one or more options to indicate that the user would like to "tinker" with or otherwise experiment with the selected nodes to determine, for example, how the nodes are used. Following the exemplary embodiment shown in FIG. 4, the user may select the "tinker example" in the configuration pane 420 after selecting one or more nodes from the graphical program shown in pane 400.

In 306, a second graphical program may be automatically generated based on the selection in 304. As used herein "automatic" means that the user is not involved in the process, but instead the computer performs the process without receiving any user input specifying the process being performed. The automatic generation of the second graphical program may be similar to that described in U.S. Patent Application Publication No. 2001/0020291, which was incorporated in its entirety above. In the context of the automatic generation in 306, the computer executing the program instructions creates the second graphical program by including at least the selected nodes of 304, interconnecting the nodes, adding any other nodes that are necessary for execution, and setting any necessary properties of the nodes or graphical program itself without requiring any user input to do so. Thus, upon automatic generation, the second graphical program includes at least the selected graphical program node(s) in 304. However, as indicated above, the second graphical program may include further nodes and interconnections to allow the second graphical program to execute.

In some embodiments, the second graphical program may include similar data types to that of the first graphical program. For example, the data types that are associated with the selected nodes (or inputs or outputs of the selected nodes) may be automatically used in the second graphical program. Thus, in some embodiments, the second graphical program may be automatically generated so as to mimic the data types of the first graphical program. However, in alternate embodiments (e.g., for the case of polymorphic nodes, which may have multiple data types), the second graphical program may use data types that are default or from an example that is associated with the selected nodes.

The second graphical program may further include a user interface portion or front panel that can be used to view or interact with the second graphical program during execution. Thus, automatic generation of the second graphical program may include automatic generation of controls and indicators associated with the nodes of the second graphical program which may be usable to interact with the second graphical program during execution. Thus, upon generation, the second graphical program may be fully executable by the user without requiring any further user input.

The second graphical program may be executable to evaluate the selected graphical program nodes of 304. More particularly, by selecting these nodes and requesting the second graphical program, the user may be able to tinker or experiment with these nodes in a sandboxed environment (i.e., not the actual graphical program the user is editing, in this case, the first graphical program) without modifying or corrupting the first graphical program. In other words, in providing the user input in 304, the user may be able to experiment with any nodes of the first graphical program in a "scratch" graphical program that is fully executable. This may be particularly useful when the first graphical program is in a non-functioning state, e.g., where the user has not finished creating the first graphical program, is attempting to add new functionality (e.g., by adding the suggested nodes to the first graphical program, but due to not fully understanding the new nodes, the user may have broken the first graphical program), etc.

Thus, with very minimal effort, the user can interact with a smaller, fully executable graphical program without affecting the first graphical program. However, it should be noted that the method may be easily extended to graphical program nodes which are not actually included in the first graphical program. For example, the user may be considering adding a new node to the first graphical program, but may wish to experiment with that node before including it in the first graphical program. In such cases, the user may be able to select such nodes in a different manner than that described in 304 above, e.g., from a palette of available graphical program nodes, among other possibilities.

Figure 5A:
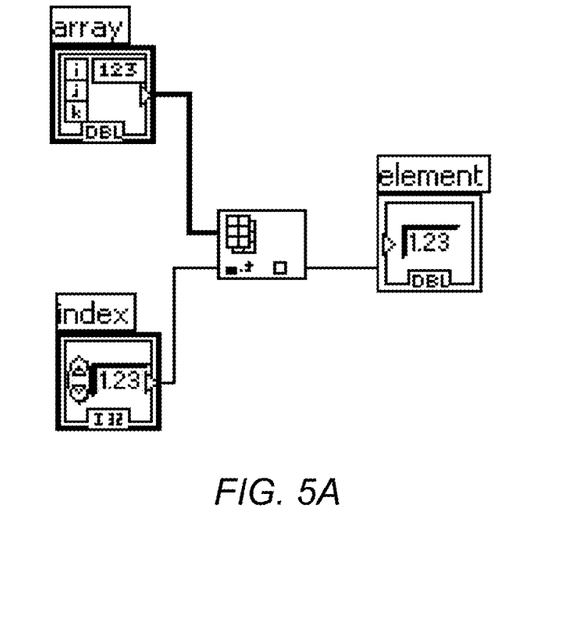
Figure 5B:
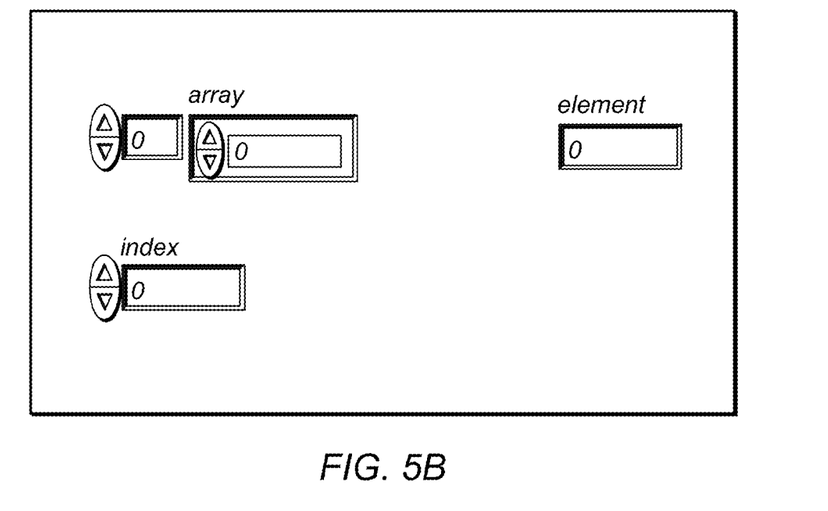

FIG. 5A illustrates an exemplary block diagram portion of a graphical program that was automatically generated based on a selection of nodes in the graphical program of FIG. 4. More specifically, the block diagram shown in FIG. 5A was automatically generated based on a selection of the index array graphical program node of FIG. 4. As shown in FIG. 5A, the index array node is included as well as three new nodes that were not part of FIG. 4, an array (of doubles) node, an index (32 bit Integer) node, and an element (double) node. As also shown by the connectivity of the nodes, the index array node receives the array and index as inputs and produces an element as output. Thus, by selecting the index array node of FIG. 4, the user can easily see a simple use case of the node and be able to experiment with this use case without endangering the parent graphical program. As is also evident, the user can more easily discern how the index array node works in the simple use of FIG. 5A rather than the more complicated use case of FIG. 4, which involves multiple iterations of a for loop with input data from a data acquisition device and output being compared and provided to a case structure. FIG. 5B illustrates a front panel portion of the graphical program, which may be automatically generated in 306 above. Thus, FIG. 5A illustrates an exemplary graphical program that was automatically created based on the selection of a single node in FIG. 4, according to an embodiment of the methods described herein.

In 308, the second graphical program may be edited, e.g., by the user. For example, the user may modify the data types of the second graphical program, change properties of the wires or nodes in the second graphical program, change the user interface of the second graphical program etc. In one embodiment, the user may provide user input adding one or more additional nodes to the second graphical program, after it has been automatically generated. For example, the user may add further nodes from the first graphical program (e.g., to make his experimentation in the second graphical program more similar to the situation of the first graphical program) and/or may add further nodes from a graphical program node palette, among other possibilities. Thus, the user may edit the second graphical program in any number of ways to further experiment with the selected nodes (e.g., from 304).

At any point after automatic generation of the second graphical program in 306, the user may view the second graphical program on the display, edit the second graphical program, or execute the second graphical program. For example, the user may execute the second graphical program, add one or more additional nodes and interconnect those additional nodes to the nodes of the second graphical program, and execute the second graphical program to further experiment with the nodes. During execution, the user may interact with the second graphical program (modified or not) using the front panel of the second graphical program.

In further embodiments, e.g., where the nodes of the second graphical program correspond to the first graphical program, the user may apply any changes made to the second graphical program to the first graphical program. For example, the user may be using the second graphical program to add functionality to the first graphical program in an isolated or sandboxed way to avoid any complications that may occur from editing directly in the first graphical program. After completing or being satisfied with the second graphical program, the user may wish to apply these changes to the first graphical program, e.g., in an automatic fashion. For example, the user may be able to select an "incorporate changes" option, and the second graphical program may be merged with the first graphical program.

Applying the changes of the second graphical program to the first graphical program may be performed automatically and may limit the number of modifications required to perform the application of the changes. For example, any additional input nodes that were added to the second graphical program to make it executable may be removed during incorporation with the first graphical program (e.g., replaced with actual graphical program nodes of the first graphical program). The user may be able to view the differences between the two graphical programs and select how the automatically determined merge is applied. Displaying the differences between graphical programs and merging the graphical programs may be performed in the manner described in U.S. Publication 2006/019105 and U.S. Pat. No. 5,974,254, which were incorporated by reference in their entirety above.

ADVANTAGES

The present method offers a multitude of advantages over previously available options. For example, as indicated above, a user could not previously create new graphical programs for evaluation in an automatic fashion as described herein. Instead, the user would have to manually create a new graphical program, add all necessary nodes to make the new graphical program execute, and add the necessary controls and indicators. Thus, the above method provides the user with an easy and efficient method for evaluating graphical program nodes that has not been previously available.

Additionally, while LabVIEW, provided from National Instruments Corporation, previously allowed the user to automatically create subVIs, it did not allow for the advantages available via the method described above. For example, to create a subVI, a user could select one or more graphical program nodes in a graphical program and select a "create subVI" option. This would replace the selected program nodes with the subVI and provide a front panel for the subVI. However, editing the subVI still resulted in editing the graphical program and did not allow the user to evaluate or experiment with the selected nodes as described herein. Finally, the subVI did not automatically create and connect controls and indicators for all inputs and outputs of the selected graphical program nodes. Thus, the method described herein has numerous advantages over previously available graphical programming methods.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory, computer accessible memory medium comprising program instructions that are executable by a processor to:

display a first graphical program on a display, wherein the first graphical program comprises a plurality of interconnected nodes which visually specifies functionality of the first graphical program;

receive user input selecting at least one of the plurality of interconnected nodes while editing the first graphical program;

automatically generate a second graphical program based on the user input, wherein the second graphical program comprises the at least one of the plurality of interconnected nodes and one or more additional graphical program nodes coupled to the at least one of the plurality of interconnected nodes, wherein said automatically generating the second graphical program determines the one or more additional graphical program nodes and is performed without requiring additional user input, and wherein the second graphical program is executable independently of the first graphical program to experiment with or evaluate the at least one of the plurality of interconnected nodes; and display the second graphical program on the display.

2. The memory medium of claim 1, wherein the second graphical program comprises a user interface portion, wherein the user interface portion comprises one or more controls or indicators corresponding to the at least one of the plurality of interconnected nodes, and wherein the program instructions are further executable to:

execute the second graphical program, wherein said executing the second graphical program comprises displaying the user interface portion of the second graphical program.

3. The memory medium of claim 1, wherein the second graphical program comprises one or more data types which correspond to data types of the first graphical program that are associated with the at least one of the plurality of interconnected nodes of the first graphical program.

4. The memory medium of claim 1, wherein the at least one of the plurality of interconnected nodes comprises two or more of the plurality of interconnected nodes.

5. The memory medium of claim 1, wherein the program instructions are further executable to:

receive second user input adding a second one or more additional nodes to the second graphical program.

6. The memory medium of claim 5, wherein the second one or more additional nodes are from the first graphical program.

7. The memory medium of claim 5, wherein the second one or more additional nodes are from a graphical program node palette.

8. The memory medium of claim 1, wherein the program instructions are further executable to:

receive second user input editing the second graphical program.

9. The memory medium of claim 8, wherein the program instructions are further executable to:

receive third user input specifying application of changes made to the second graphical program to the first graphical program; and automatically modify the first graphical program based on the second and third user input.

10. A method, comprising:

displaying a first graphical program on a display, wherein the first graphical program comprises a plurality of interconnected nodes which visually specifies functionality of the first graphical program;

receiving user input selecting at least one of the plurality of interconnected nodes while editing the first graphical program;

automatically generating a second graphical program based on the user input, wherein the second graphical program comprises the at least one of the plurality of interconnected nodes and one or more additional graphical program nodes coupled to the at least one of the plurality of interconnected nodes, wherein said automatically generating the second graphical program determines the one or more additional graphical program nodes and is performed without requiring additional user input, and wherein the second graphical program is executable independently of the first graphical program to experiment with or evaluate the at least one of the plurality of interconnected nodes; and displaying the second graphical program on the display.

11. The method of claim 10, wherein the second graphical program comprises a user interface portion, wherein the user interface portion comprises one or more controls or indicators corresponding to the at least one of the plurality of interconnected nodes, and wherein the method further comprises:

executing the second graphical program, wherein said executing the second graphical program comprises displaying the user interface portion of the second graphical program.

12. The method of claim 10, wherein the second graphical program comprises one or more data types which correspond to data types of the first graphical program that are associated with the at least one of the plurality of interconnected nodes.

13. The method of claim 10, wherein the at least one of the plurality of interconnected nodes comprises two or more of the plurality of interconnected nodes.

14. The method of claim 10, further comprising:

receiving second user input adding a second one or more additional nodes to the second graphical program.

15. The method of claim 14, wherein the second one or more additional nodes are from the first graphical program.

16. The method of claim 14, wherein the second one or more additional nodes are from a graphical program node palette.

17. The method of claim 10, further comprising:

receiving second user input editing the second graphical program;

receiving third user input specifying application of changes made to the second graphical program to the first graphical program; and automatically modifying the first graphical program based on the second and third user input.

18. A system, comprising:

a processor;

a display coupled to the processor; and a memory medium coupled to the processor, wherein the memory medium stores program instructions executable by the processor to:

display a first graphical program on the display, wherein the first graphical program comprises a plurality of interconnected nodes which visually specifies functionality of the first graphical program;

receive user input selecting at least one of the plurality of interconnected nodes while editing the first graphical program;

automatically generate a second graphical program based on the user input, wherein the second graphical program comprises the at least one of the plurality of interconnected nodes and one or more additional graphical program nodes coupled to the at least one of the plurality of interconnected nodes, wherein said automatically generating the second graphical program determines the one or more additional graphical program nodes and is performed without requiring additional user input, and wherein the second graphical program is executable independently of the first graphical program to experiment with or evaluate the at least one of the plurality of interconnected nodes; and display the second graphical program on the display.

19. A non-transitory, computer accessible memory medium comprising program instructions that are executable by a processor to:

display a first graphical program on a display, wherein the first graphical program comprises a plurality of interconnected nodes which visually specifies functionality of the first graphical program;

receive user input selecting at least one of the plurality of interconnected nodes while editing the first graphical program;

automatically generate a second graphical program based on the user input, wherein the second graphical program comprises the at least one of the plurality of interconnected nodes and one or more additional graphical program nodes coupled to the at least one of the plurality of interconnected nodes, wherein the at least one of the plurality of interconnected nodes of the second graphical program is separate from the at least one of the plurality of interconnected nodes of the first graphical program, wherein said automatically generating the second graphical program is performed without requiring additional user input, and wherein the second graphical program is executable independently of the first graphical program to evaluate the at least one of the plurality of interconnected nodes of the first graphical program; and display the second graphical program on the display.

20. A method, comprising:

displaying a first graphical program on a display, wherein the first graphical program comprises a plurality of interconnected nodes which visually specifies functionality of the first graphical program;

receiving user input selecting at least one of the plurality of interconnected nodes while editing the first graphical program;

automatically generating a second graphical program based on the user input, wherein the second graphical program comprises the at least one of the plurality of interconnected nodes and one or more additional graphical program nodes coupled to the at least one of the plurality of interconnected nodes, wherein the at least one of the plurality of interconnected nodes of the second graphical program is independently executable from the at least one of the plurality of interconnected nodes of the first graphical program, wherein said automatically generating the second graphical program is performed without requiring additional user input, and wherein the second graphical program is executable independently of the first graphical program to evaluate the at least one of the plurality of interconnected nodes of the first graphical program; and displaying the second graphical program on the display.

* * * * *